United States Patent
Deritis et al.

(10) Patent No.: US 9,930,866 B2
(45) Date of Patent: Apr. 3, 2018

(54) AUTOMATIC ANIMAL FEEDING ASSEMBLY

(71) Applicants: Matthew Deritis, Whitehall, PA (US); Victoria Kidd, Whitehall, PA (US)

(72) Inventors: Matthew Deritis, Whitehall, PA (US); Victoria Kidd, Whitehall, PA (US)

( * ) Notice: Subject to any disclaimer, the term of this patent is extended or adjusted under 35 U.S.C. 154(b) by 268 days.

(21) Appl. No.: 15/048,316

(22) Filed: Feb. 19, 2016

(65) Prior Publication Data

US 2017/0238503 A1 Aug. 24, 2017

(51) Int. Cl.
*A01K 5/02* (2006.01)
*G05B 15/02* (2006.01)

(52) U.S. Cl.
CPC .......... *A01K 5/0291* (2013.01); *A01K 5/0275* (2013.01); *G05B 15/02* (2013.01)

(58) Field of Classification Search
CPC .. A01K 5/0216; A01K 5/0291; A01K 5/0275; B65D 83/0409; B65D 83/0445
USPC ....... 119/51.11, 51.13, 53, 57.1, 57.5, 57.92, 119/61.5; 222/370, 386
See application file for complete search history.

(56) References Cited

U.S. PATENT DOCUMENTS

| | | | | |
|---|---|---|---|---|
| 2,189,213 A | * | 2/1940 | MacDonell | A01K 5/0291 119/51.13 |
| 2,256,210 A | * | 9/1941 | MacDonell | A01K 5/0291 119/51.13 |
| 2,500,243 A | * | 3/1950 | Dixon | A01K 5/0291 119/51.13 |
| 2,969,769 A | * | 1/1961 | Paschall | A01K 5/0275 119/53 |
| 3,340,851 A | * | 9/1967 | Frank | A01K 5/0291 119/51.13 |
| 4,249,483 A | | 2/1981 | Sobky | |
| 4,421,059 A | | 12/1983 | Cousin | |
| 4,485,765 A | * | 12/1984 | Schwartz | A01K 5/0291 119/51.13 |
| 4,840,143 A | | 6/1989 | Simon | |
| 8,220,413 B2 | | 7/2012 | Laro | |
| D703,392 S | | 4/2014 | Desberg | |
| 2003/0015144 A1 | | 1/2003 | Bennett et al. | |

(Continued)

FOREIGN PATENT DOCUMENTS

FR 2701353 A1 * 8/1994 .......... A01K 5/0291
WO WO03053137 7/2003

*Primary Examiner* — David J Parsley
*Assistant Examiner* — Danielle A Clerkley (57) ABSTRACT

An automated animal feeding assembly includes a housing that may be positioned to be accessible to an animal. A turret is rotatably coupled to the housing. A plurality of tubes is provided and each of the tubes is positioned within the turret. Each of the tubes may contain animal food. A rotation unit is positioned within the housing. The rotation unit engages the turret such that the rotation unit selectively rotates the turret. A dispensing unit is positioned within the housing. The dispensing unit selectively urges the animal food outwardly from the tubes into the third well. Thus, the animal may consume the animal food. A control is coupled to the housing and the control may be manipulated. The control is electrically coupled to rotation unit and the dispensing unit. Thus, the control controls operational parameters of each of the rotation unit and the dispensing unit.

18 Claims, 6 Drawing Sheets

(56) References Cited

U.S. PATENT DOCUMENTS

2007/0095296 A1  5/2007  Zuccaro
2013/0247829 A1  9/2013  Taneja

* cited by examiner

AUTOMATIC ANIMAL FEEDING ASSEMBLY

BACKGROUND OF THE DISCLOSURE

Field of the Disclosure

The disclosure relates to feeding devices and more particularly pertains to a new feeding device for automatically feeding an animal on a pre-determined schedule.

SUMMARY OF THE DISCLOSURE

An embodiment of the disclosure meets the needs presented above by generally comprising a housing that may be positioned to be accessible to an animal. A turret is rotatably coupled to the housing. A plurality of tubes is provided and each of the tubes is positioned within the turret. Each of the tubes may contain animal food. A rotation unit is positioned within the housing. The rotation unit engages the turret such that the rotation unit selectively rotates the turret. A dispensing unit is positioned within the housing. The dispensing unit selectively urges the animal food outwardly from the tubes into the third well. Thus, the animal may consume the animal food. A control is coupled to the housing and the control may be manipulated. The control is electrically coupled to rotation unit and the dispensing unit. Thus, the control controls operational parameters of each of the rotation unit and the dispensing unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
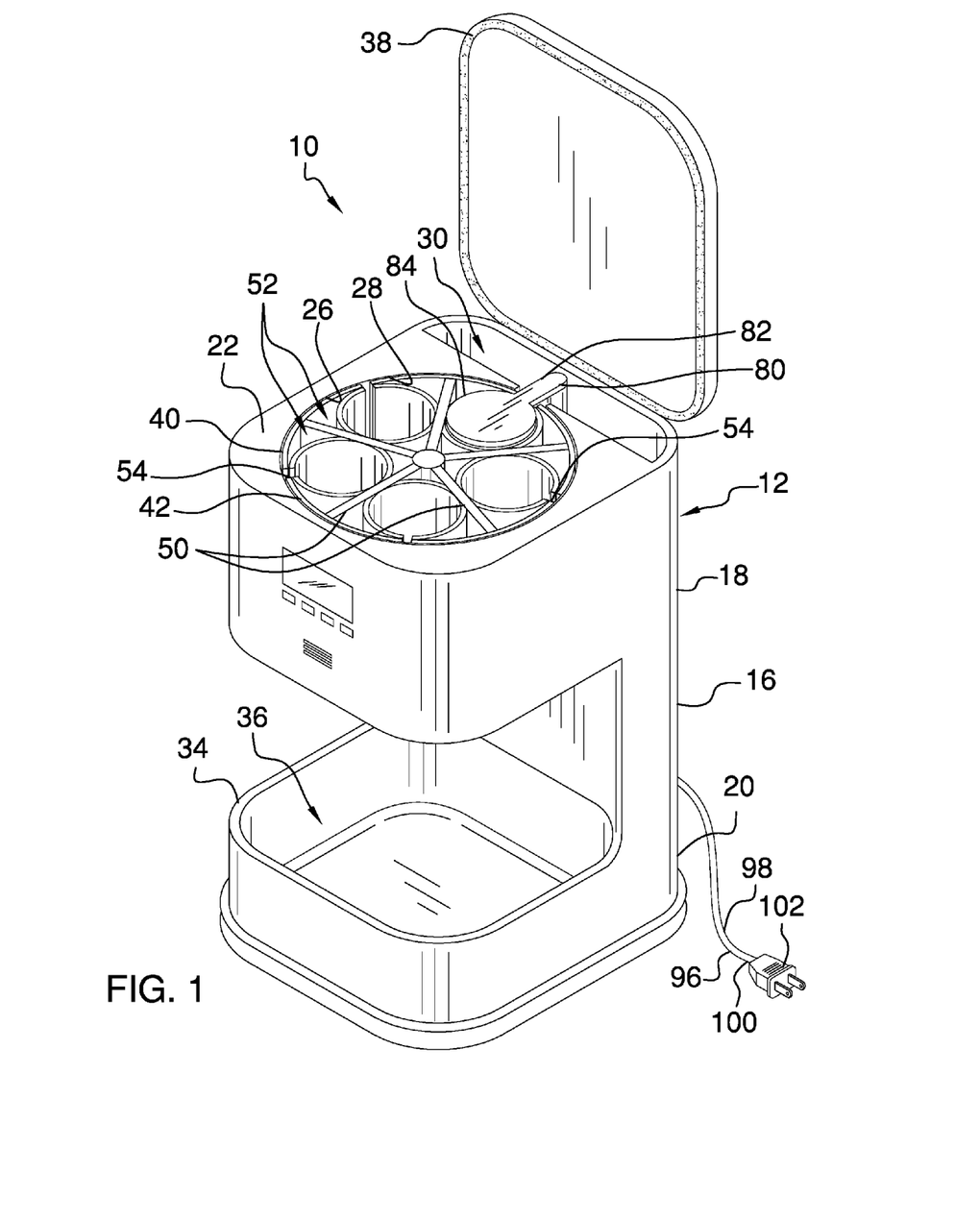
FIG. 1 is a top perspective view of an automated animal feeding assembly according to an embodiment of the disclosure.
Figure 2:
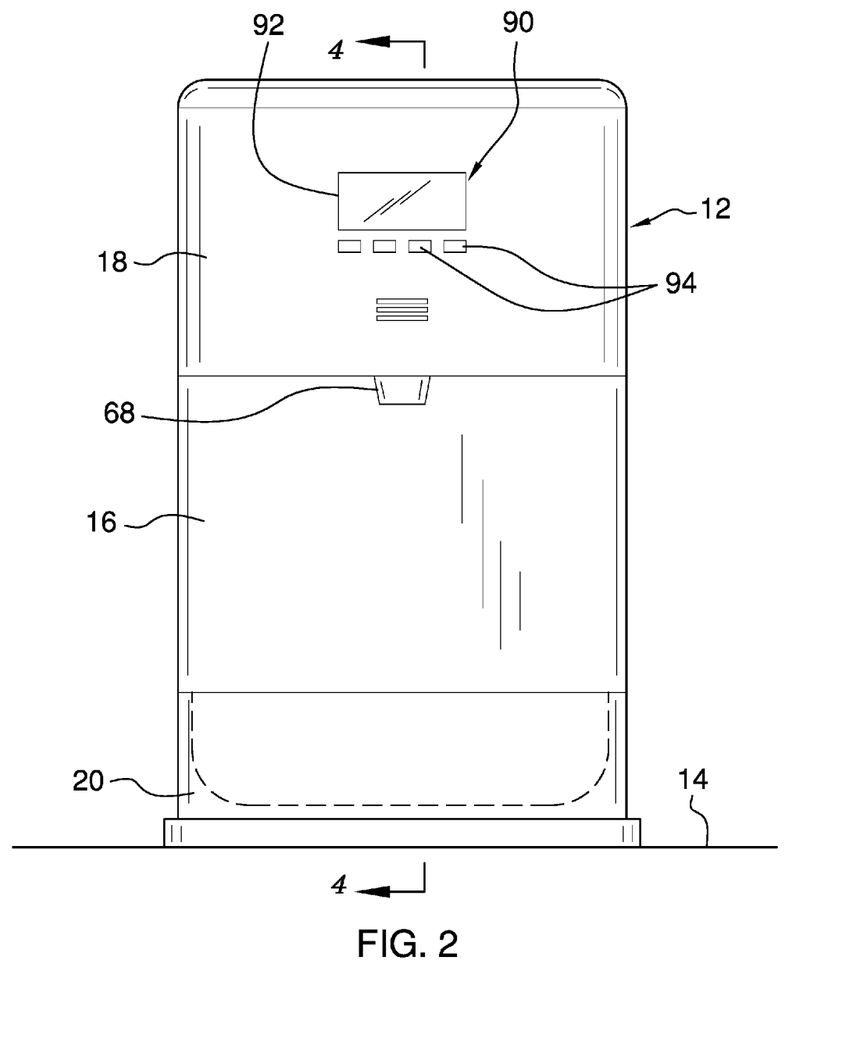
FIG. 2 is a front view of an embodiment of the disclosure.
Figure 3:
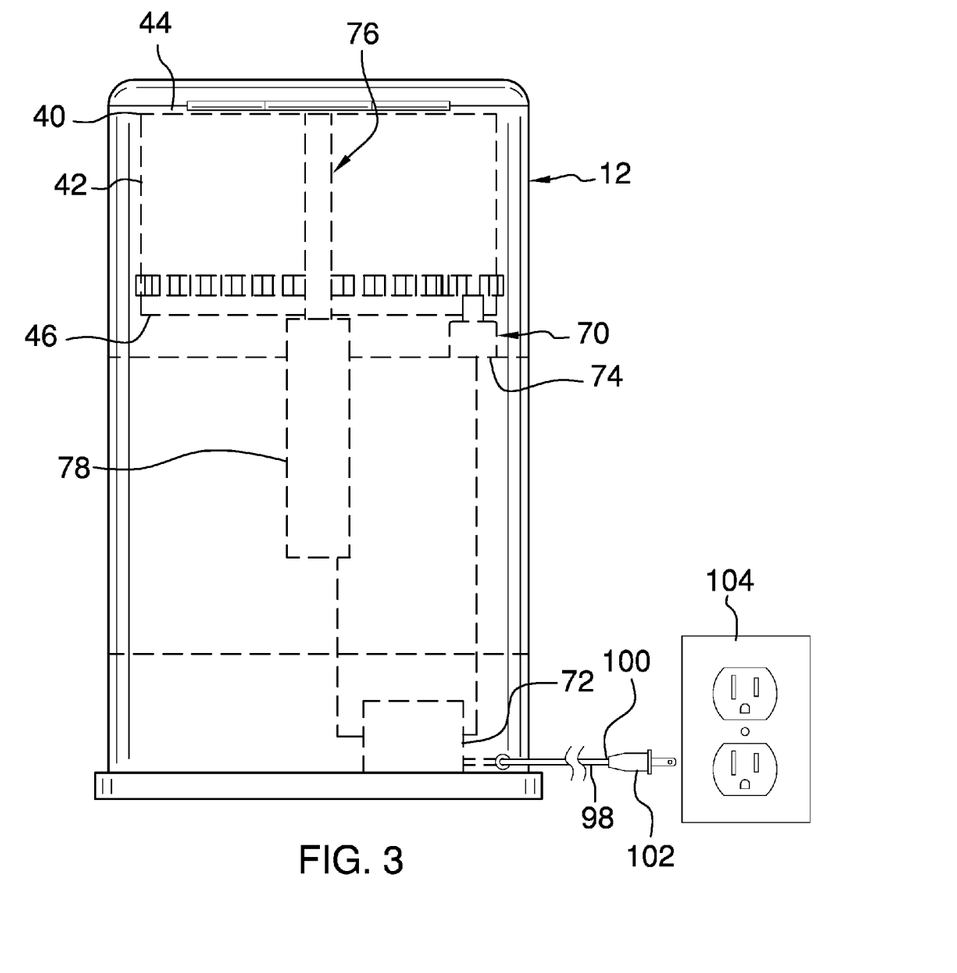
FIG. 3 is a rear phantom view of an embodiment of the disclosure.
Figure 4:
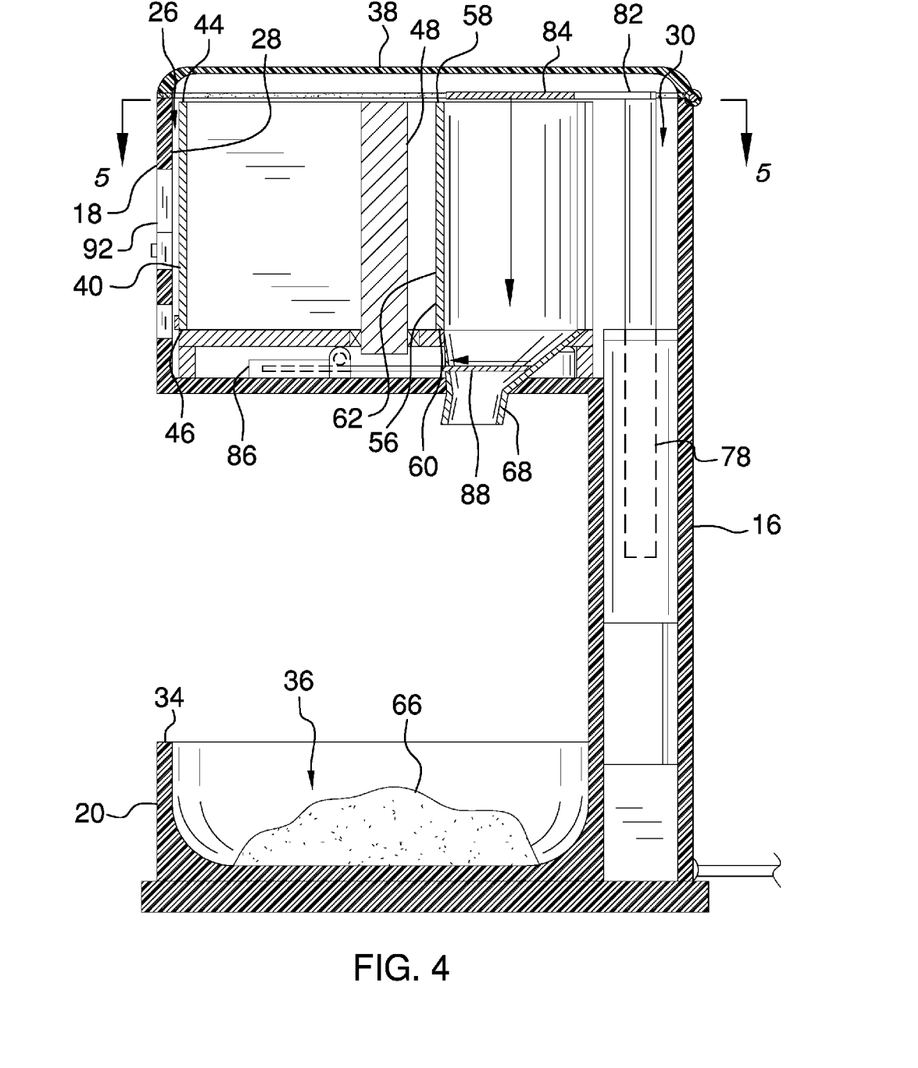
FIG. 4 is a cross sectional view taken along line 4-4 of FIG. 2 of an embodiment of the disclosure.
Figure 5:
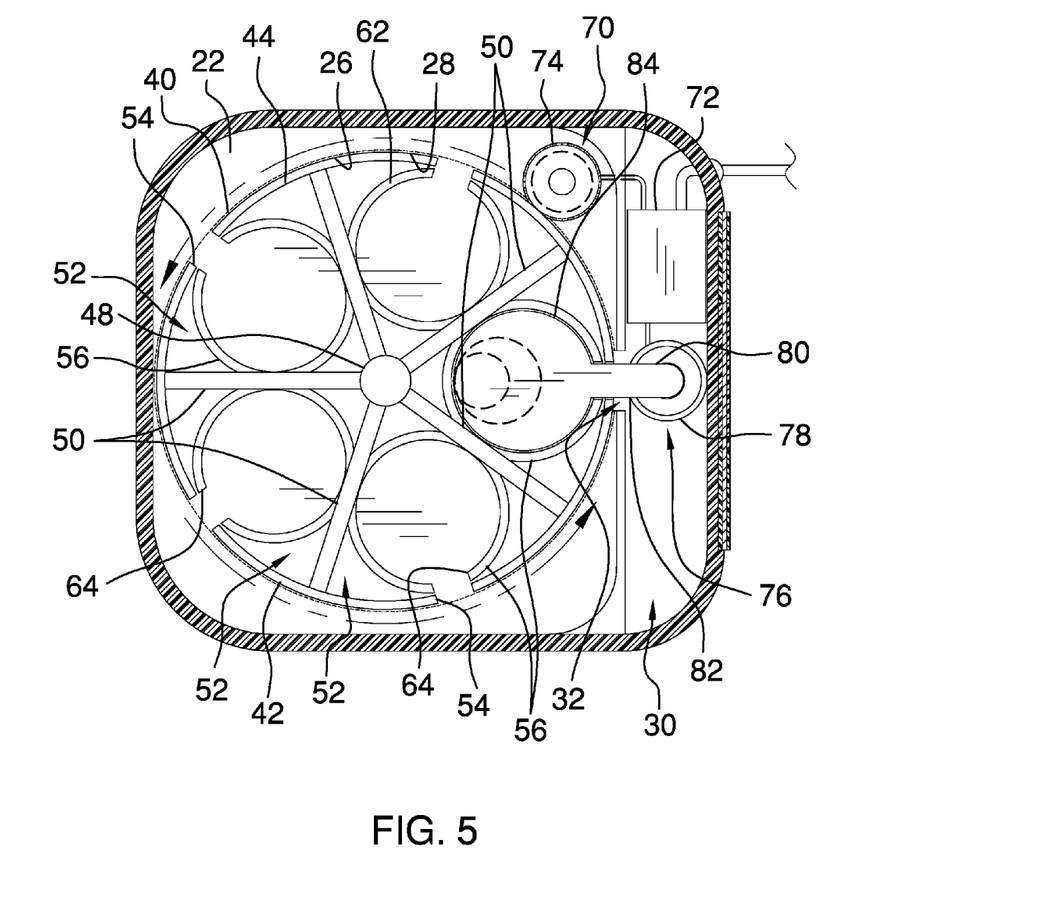
FIG. 5 is a cross sectional view taken along line 5-5 of FIG. 4 of an embodiment of the disclosure.
Figure 6:
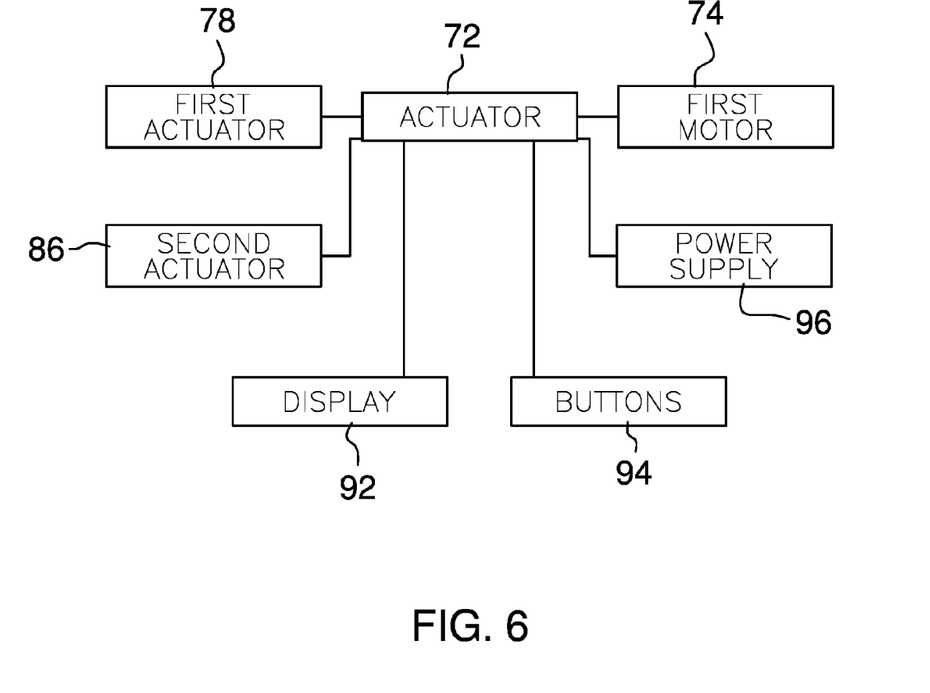
FIG. 6 is a schematic view of an embodiment of the disclosure.

With reference now to the drawings, and in particular to FIGS. 1 through 6 thereof, a new feeding device embodying the principles and concepts of an embodiment of the disclosure and generally designated by the reference numeral 10 will be described.

As best illustrated in FIGS. 1 through 6, the automated animal feeding assembly 10 generally comprises a housing 12 that may be positioned on a support surface 14 thereby facilitating the housing 12 to be accessible to an animal. The animal may comprise a housecat or the like. The support surface 14 may comprise a floor or the like. The housing 12 comprises a central portion 16 extending between an upper portion 18 and a lower portion 20. The upper portion 18 is spaced from the lower portion 20 and the lower portion 20 may abut the support surface 14.

Each of the upper portion 18 and the lower portion 20 extends forwardly from the central portion 16. The central portion 16 is substantially hollow. The upper portion 18 has a top wall 22 and a bottom wall 24. The top wall 22 has a first well 26 extending downwardly therein and the first well 26 has a bounding surface 28. The bounding surface 28 is continuous such that the first well 26 has a cylindrical shape.

The top wall 22 has a second well 30 extending downwardly therein. The second well 30 is in fluid communication with an interior of the central portion 16. The upper portion 18 has a channel 32 extending between the first well 26 and the second well 30. The channel 32 is vertically coextensive with the bounding surface 28 of the first well 26. The lower portion 20 has an upper wall 34 and the upper wall 34 has a third well 36 extending downwardly therein.

A lid 38 is hingedly coupled to the top wall 22 and the lid 38 may be manipulated. The lid 38 selectively covers the top wall 22. A turret 40 is rotatably coupled to the housing 12. The turret 40 has an outer wall 42 and the outer wall 42 is continuous such that the turret 40 has a cylindrical shape. The turret 40 has an upper end 44 and a lower end 46. Each of the upper end 44 and the lower end 46 is open into an interior of the turret 40.

The turret 40 includes a shaft 48 that is centrally positioned within the turret 40. The turret 40 includes a plurality of dividers 50. Each of the dividers 50 extends between the shaft 48 and the outer wall 42. The dividers 50 are spaced apart from each other and are distributed around the shaft 48 to define a plurality of spaces 52 in the turret 40.

The turret 40 is positioned within the first well 26 having the outer wall 42 being coextensive with the bounding surface 28 of the first well 26. The outer wall 42 has a plurality of first slots 54 extending therethrough. Each of the first slots 54 is centrally positioned with respect to an associated one of the spaces 52. Each of the first slots 54 extends between the upper end 44 and the lower end 46.

A plurality of tubes 56 is provided. Each of the tubes 56 has a top end 58, a bottom end 60 and an exterior wall 62 extending between the top end 58 and the bottom end 60. The exterior wall 62 corresponding to each of the tubes 56 has a second slot 64 extending therethrough. The second slot 64 extends between the top end 58 and the bottom end 60 of an associated one of the tubes 56.

Each of the tubes 56 is positioned within an associated one of the spaces 52 in the turret 40. Each of the tubes 56 is vertically oriented within the turret 40. The second slot 64 in each of the tubes 56 is aligned with a corresponding one of the first slots 54. Each of the tubes 56 may contain animal food 66. The animal food 66 may comprise moist cat food or the like.

Each of the tubes 56 may be fixedly positioned with the associated spaces 52. The animal food 66 may be poured into the top end 58 of each of the tubes 56. Each of the tubes 56 may be pre-filled with the animal food 66. The pre-filled tubes 56 may be removably and selectively positioned within the associated spaces 52. The pre-filled tubes 56 may be manufactured by an animal food manufacturer or the like.

A funnel 68 is coupled to and extends downwardly from the bottom wall 24 of the upper portion 18. The funnel 68 is in fluid communication with the first well 26. The funnel 68 is aligned with the third well 36 in the lower portion 20. The funnel 68 is positioned proximate the central portion 16 of the housing 12.

A rotation unit 70 is positioned within the housing 12. The rotation unit 70 engages the turret 40 such that the rotation unit 70 selectively rotates the turret 40. The rotation unit 70 comprises a processor 72 that is positioned within the housing 12. The processor 72 may include an electronic clock and an electronic memory. The processor may 72 comprise an electronic processor or the like.

A first motor 74 is positioned within the housing 12 and the first motor 74 is electrically coupled to the processor 72. The first motor 74 engages the turret 40 such that first motor 74 selectively rotates the turret 40. The first motor 74 selectively aligns each of the tubes 56 with the funnel 68. Thus, the funnel 68 may direct the animal food 66 into the third well 36. The first motor 74 is in communication with the turret 40 through any conventional mechanical means, including but not being limited to, a pair of meshing gears or a belt.

A dispensing unit 76 is positioned within the housing 12. The dispensing unit 76 selectively urges the animal food 66 outwardly from the tubes 56 into the third well 36. Thus, the animal may consume the animal food 66 from the third well 36. The dispensing unit 76 comprises a first actuator 78 and a plunger 80.

The first actuator 78 may comprise an electrically controlled linear actuator or the like. The first actuator 78 is vertically oriented in the second well 30. The first actuator 78 is electrically coupled to the processor 72. The processor 72 turns the first actuator 78 on at a pre-determined time.

The plunger 80 includes a stem 82 and a paddle 84. The stem 82 is coupled to the first actuator 78. The processor 72 is synchronized with the first motor 74. Thus, the first motor 74 rotates the turret 40 to align the paddle 84 with an associated one of the tubes 56. The first actuator 78 selectively urges the plunger 80 upwardly and downwardly. The stem 82 selectively travels in each of the first slots 54 in the turret 40 and the second slot 64 in an associated one of the tubes 56. The paddle 84 travels within the associated tube 56. Thus, the paddle 84 may urge the animal food 66 downwardly out of the associated tube 56.

A second actuator 86 is provided and the second actuator 86 is positioned within the upper portion 18 of the housing 12. The second actuator 86 is electrically coupled to the processor 72 such that the processor 72 turns the second actuator 86 on at the predetermined time. The second actuator 86 may comprise an electrically controlled linear actuator or the like.

A door 88 is movably positioned within the funnel 68 and the door 88 is mechanically coupled to the second actuator 86. The second actuator 86 positions the door 88 in an open position. Thus, the door 88 allows the animal food 66 to pass through the funnel 68. The second actuator 86 positions the door 88 in a closed position. Thus, the door 88 inhibits the animal food 66 from passing through the funnel 68.

A control 90 is coupled to the housing 12 and the control 90 may be manipulated. The control 90 is electrically coupled to rotation unit 70 and the dispensing unit 76. Thus, the control 90 controls operational parameters of each of the rotation unit 70 and the dispensing unit 76. The control 90 comprises a display 92 that is coupled to the upper portion 18 such that the display 92 is visible. The display 92 is electrically coupled to the processor 72 and the display 92 may comprise an LED or the like. The display 92 displays the operational parameters of the rotation unit 70 and the dispensing unit 76.

A plurality of buttons 94 is provided. Each of the buttons 94 is coupled to the upper portion 18 and each of the buttons 94 may be manipulated. Each of the buttons 94 is electrically coupled to the processor 72. Thus, each of the buttons 94 programs operational parameters of the rotation unit 70 and the dispensing unit 76. The operational parameters may include a time of day that rotation unit 70 and the dispensing unit 76 operate in tandem to dispense the animal food 66.

A power supply 96 is positioned within the housing 12 and the power supply 96 is electrically coupled to the processor 72. The power supply 96 comprises a power cord 98 extending outwardly from the housing 12. The power cord 98 has a distal end 100 with respect to the housing 12. A plug 102 is electrically coupled to the distal end 100. The plug 102 may be electrically coupled to a power source 104. The power source 104 may comprise an electrical outlet or the like.

In use, the animal food 66 is poured into each of the tubes 56. Alternatively, the pre-filled tubes 56 are each positioned within the associated spaces 52 in the turret 40. The buttons 94 are manipulated to program the processor 72. The processor 72 is programmed to facilitate each of rotation unit 70 and the dispensing unit 76 to release the animal food 66 into the third well 36 at the pre-determined time. Thus, the animal is fed on a pre-determined schedule without human supervision.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An automated animal feeding assembly comprising:
   a housing being configured to be positioned on a support surface thereby facilitating said housing to be accessible to an animal;
   a turret being rotatably coupled to said housing;
   a plurality of tubes, each of said tubes being positioned within said turret, each of said tubes being configured to contain animal food;
   a rotation unit being positioned within said housing, said rotation unit engaging said turret such that said rotation unit selectively rotates said turret;

a dispensing unit being positioned within said housing wherein said dispensing unit is configured to selectively urge the animal food outwardly from said tubes into a receiving well thereby facilitating the animal to consume the animal food; and
a control being coupled to said housing wherein said control is configured to be manipulated, said control being electrically coupled to rotation unit and said dispensing unit such that said control controls operational parameters of each of said rotation unit and said dispensing unit;
   wherein said turret has an outer wall, said outer wall being continuous such that said turret has a cylindrical shape, said turret having an upper end and a lower end, each of said upper end and said lower end being open into an interior of said turret, said outer wall having a plurality of first slots extending between said upper end and said lower end, said first slots being configured to receive and allow said dispensing unit to selectively travel in each of said first slots.

2. The assembly according to claim 1, wherein said housing comprises a central portion extending between an upper portion and a lower portion, said upper portion being spaced from said lower portion, said lower portion being configured to abut the support surface, each of said upper portion and said lower portion extending forwardly from said central portion, said central portion being substantially hollow, said lower portion having an upper wall, said upper wall having said receiving well extending downwardly therein.

3. The assembly according to claim 2, wherein said upper portion has a top wall and a bottom wall, said top wall having a first well extending downwardly therein, said first well having a bounding surface, said bounding surface being continuous such that said first well has a cylindrical shape, said top wall having a second well extending downwardly therein, said second well being in fluid communication with an interior of said central portion.

4. The assembly according to claim 3, wherein said upper portion has a channel extending between said first well and said second well, said channel being vertically coextensive with said bounding surface of said first well.

5. The assembly according to claim 1, wherein said turret includes a shaft being centrally positioned within said turret, said turret including a plurality of dividers, each of said dividers extending between said shaft and said outer wall, said dividers being spaced apart from each other and distributed around said shaft to define a plurality of spaces in said turret, said turret being positioned within said first well having said outer wall being coextensive with said bounding surface of said first well.

6. The assembly according to claim 5, wherein each of said first slots being centrally positioned with respect to an associated one of said spaces.

7. The assembly according to claim 1, wherein each of said tubes has a top end, a bottom end and an exterior wall extending between said top end and said bottom end, said exterior wall corresponding to each of said tubes having a second slot extending therethrough, said second slot extending between said top end and said bottom end of an associated one of said tubes.

8. The assembly according to claim 7, wherein each of said tubes is vertically oriented within said turret, said second slot in each of said tubes being aligned with a corresponding one of said first slots.

9. The assembly according to claim 3, further comprising a funnel being coupled to and extending downwardly from said bottom wall of said upper portion, said funnel being in fluid communication with said first well, said funnel being aligned with said third receiving well in said lower portion.

10. The assembly according to claim 1, wherein said rotation unit comprises: a processor being positioned within said housing; a first motor being positioned within said housing, said first motor being electrically coupled to said processor, said first motor engaging said turret such that first motor selectively rotates said turret having each of said tubes being selectively aligned with a funnel wherein said funnel is configured to direct the animal food into said receiving well.

11. The assembly according to claim 2, further comprising:
   a processor; and
   said dispensing unit comprising a first actuator being positioned within said second well, said first actuator being vertically oriented in said second well, said first actuator being electrically coupled to said processor such that said processor turns said first actuator on at a pre-determined time.

12. The assembly according to claim 11, further comprising: each of said tubes having a second slot; and a plunger having a stem and a paddle, said stem being coupled to said first actuator, said paddle being aligned with an associated one of said tubes, said first actuator selectively urging said plunger upwardly and downwardly having said stem travelling in said first slot in said turret and said second slot in an associated one of said tubes, said paddle traveling within said associated tube wherein said paddle is configured to urge the animal food downwardly out of said associated tube.

13. The assembly according to claim 2, further comprising:
   a processor; and
   a second actuator being positioned within said upper portion, said second actuator being electrically coupled to said processor such that said processor turns said second actuator on at the predetermined time.

14. The assembly according to claim 13, further comprising:
   a funnel; and
   a door being movably positioned within said funnel, said door being mechanically coupled to said second actuator, said second actuator positioning said door in an open position wherein said door is configured to allow the animal food to pass through said funnel, said second actuator positioning said door in a closed position wherein said door is configured to inhibit the animal food from passing through said funnel.

15. The assembly according to claim 2, further comprising:
   a processor; and
   a display being coupled to said upper portion wherein said display is configured to be visible, said display being electrically coupled to said processor.

16. The assembly according to claim 15, further comprising a plurality of buttons, each of said buttons being coupled to said upper portion wherein each of said buttons is configured to be manipulated, each of said buttons being electrically coupled to said processor such that each of said buttons programs operational parameters of said rotation unit and said dispensing unit.

17. The assembly according to claim 15, further comprising a power supply being positioned within said housing, said power supply being electrically coupled to said processor, said power supply comprising a power cord extending outwardly from said housing, said power cord having a distal end with respect to said housing, said distal end having a plug being electrically coupled thereto, said plug being configured to be electrically coupled to a power source.

18. An automated animal feeding assembly comprising:
a housing being configured to be positioned on a support surface thereby facilitating said housing to be accessible to an animal, said housing comprising a central portion extending between an upper portion and a lower portion, said upper portion being spaced from said lower portion, said lower portion being configured to abut the support surface, each of said upper portion and said lower portion extending forwardly from said central portion, said central portion being substantially hollow, said upper portion having a top wall and a bottom wall, said top wall having a first well extending downwardly therein, said first well having a bounding surface, said bounding surface being continuous such that said first well has a cylindrical shape, said top wall having a second well extending downwardly therein, said second well being in fluid communication with an interior of said central portion, said upper portion having a channel extending between said first well and said second well, said channel being vertically coextensive with said bounding surface of said first well, said lower portion having an upper wall, said upper wall having a third well extending downwardly therein;
a turret being rotatably coupled to said housing, said turret having an outer wall, said outer wall being continuous such that said turret has a cylindrical shape, said turret having an upper end and a lower end, each of said upper end and said lower end being open into an interior of said turret, said turret including a shaft being centrally positioned within said turret, said turret including a plurality of dividers, each of said dividers extending between said shaft and said outer wall, said dividers being spaced apart from each other and distributed around said shaft to define a plurality of spaces in said turret, said turret being positioned within said first well having said outer wall being coextensive with said bounding surface of said first well, said outer wall having a plurality of first slots extending therethrough, each of said first slots being centrally positioned with respect to an associated one of said spaces, each of said first slots extending between said upper end and said lower end;
a plurality of tubes, each of said tubes having a top end, a bottom end and an exterior wall extending between said top end and said bottom end, said exterior wall corresponding to each of said tubes having a second slot extending therethrough, said second slot extending between said top end and said bottom end of an associated one of said tubes, each of said tubes being positioned within an associated one of said spaces in said turret, each of said tubes being vertically oriented within said turret, said second slot in each of said tubes being aligned with a corresponding one of said first slots, each of said tubes being configured to contain animal food;
a funnel being coupled to and extending downwardly from said bottom wall of said upper portion, said funnel being in fluid communication with said first well, said funnel being aligned with said third well in said lower portion;
a rotation unit being positioned within said housing, said rotation unit engaging said turret such that said rotation unit selectively rotates said turret, said rotation unit comprising:
a processor being positioned within said housing; and
a first motor being positioned within said housing, said first motor being electrically coupled to said processor, said first motor engaging said turret such that first motor selectively rotates said turret having each of said tubes being selectively aligned with said funnel wherein said funnel is configured to direct the animal food into said third well,
a dispensing unit being positioned within said housing wherein said dispensing unit is configured to selectively urge the animal food outwardly from said tubes into said third well thereby facilitating the animal to consume the animal food, said dispensing unit comprising:
a first actuator being positioned within said second well, said first actuator being vertically oriented in said second well, said first actuator being electrically coupled to said processor such that said processor turns said first actuator on at a pre-determined time,
a plunger having a stem and a paddle, said stem being coupled to said first actuator, said paddle being aligned with an associated one of said tubes, said first actuator selectively urging said plunger upwardly and downwardly having said stem travelling in said first slot in said turret and said second slot in an associated one of said tubes, said paddle traveling within said associated tube wherein said paddle is configured to urge the animal food downwardly out of said associated tube,
a second actuator being positioned within said upper portion, said second actuator being electrically coupled to said processor such that said processor turns said second actuator on at the predetermined time, and
a door being movably positioned within said funnel, said door being mechanically coupled to said second actuator, said second actuator positioning said door in an open position wherein said door is configured to allow the animal food to pass through said funnel, said second actuator positioning said door in a closed position wherein said door is configured to inhibit the animal food from passing through said funnel; and
a control being coupled to said housing wherein said control is configured to be manipulated, said control being electrically coupled to rotation unit and said dispensing unit such that said control controls operational parameters of each of said rotation unit and said dispensing unit, said control comprising:
a display being coupled to said upper portion wherein said display is configured to be visible, said display being electrically coupled to said processor,
a plurality of buttons, each of said buttons being coupled to said upper portion wherein each of said buttons is configured to be manipulated, each of said buttons being electrically coupled to said processor such that each of said buttons programs operational parameters of said rotation unit and said dispensing unit, and
a power supply being positioned within said housing, said power supply being electrically coupled to said processor, said power supply comprising a power cord extending outwardly from said housing, said power cord having a distal end with respect to said housing, said distal end having a plug being electrically coupled thereto, said plug being configured to be electrically coupled to a power source.

* * * * *